May 5, 1964
F. J. LUKETA
3,131,501
LINES FOR TRAWL NETS
Filed April 9, 1962
5 Sheets-Sheet 1
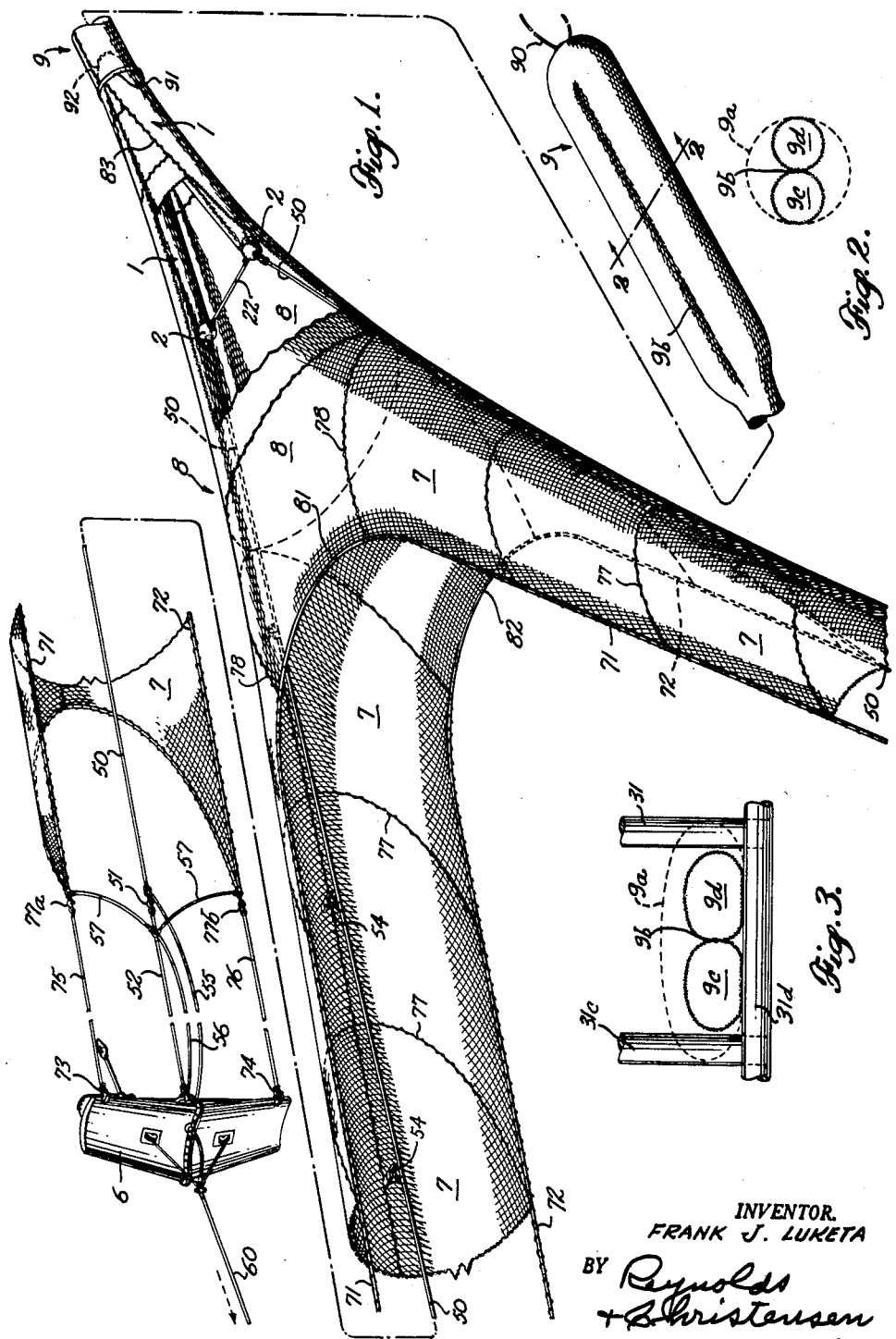
INVENTOR.
FRANK J. LUKETA
BY Reynolds
+Christensen
ATTORNEYS

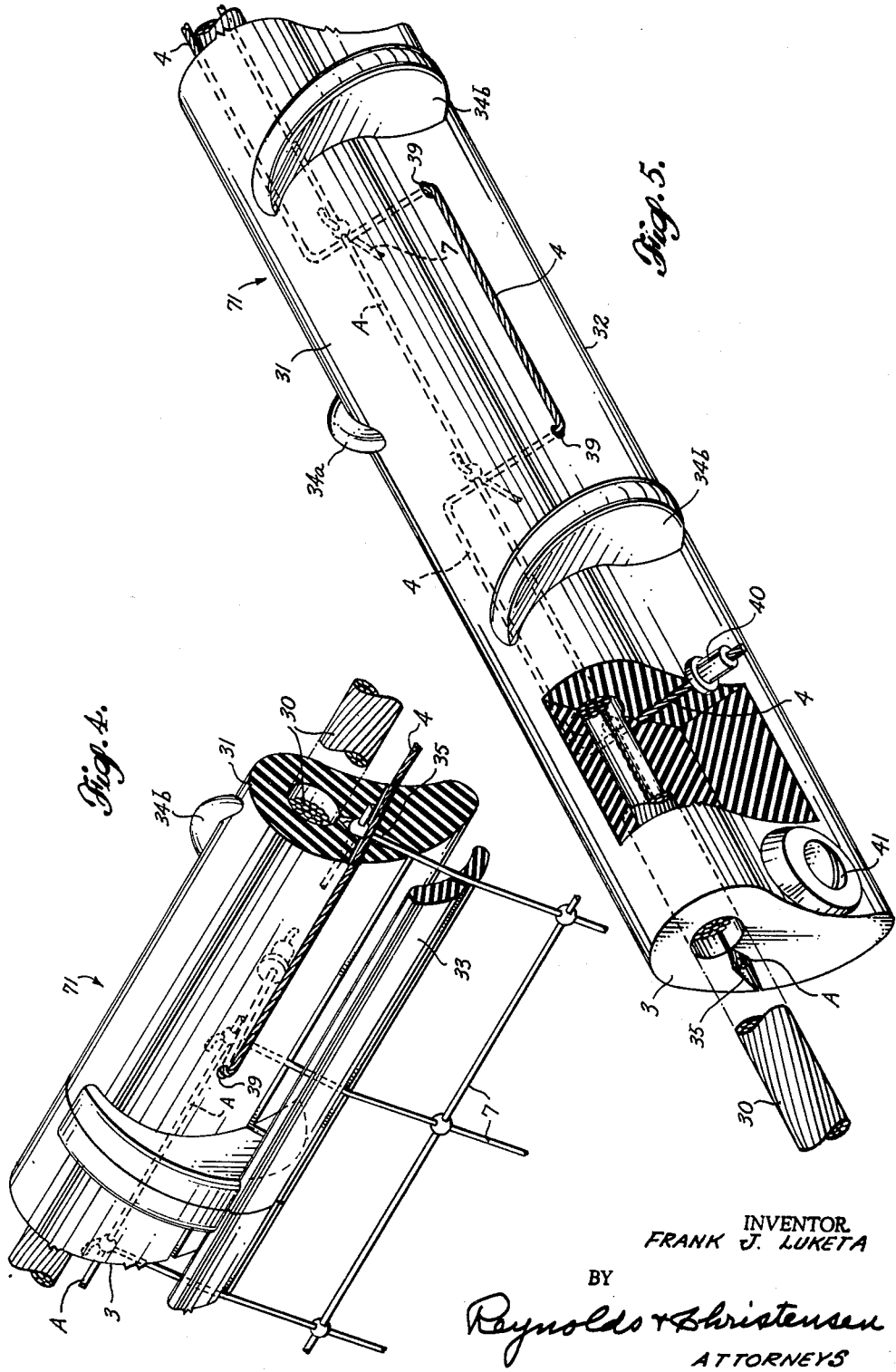

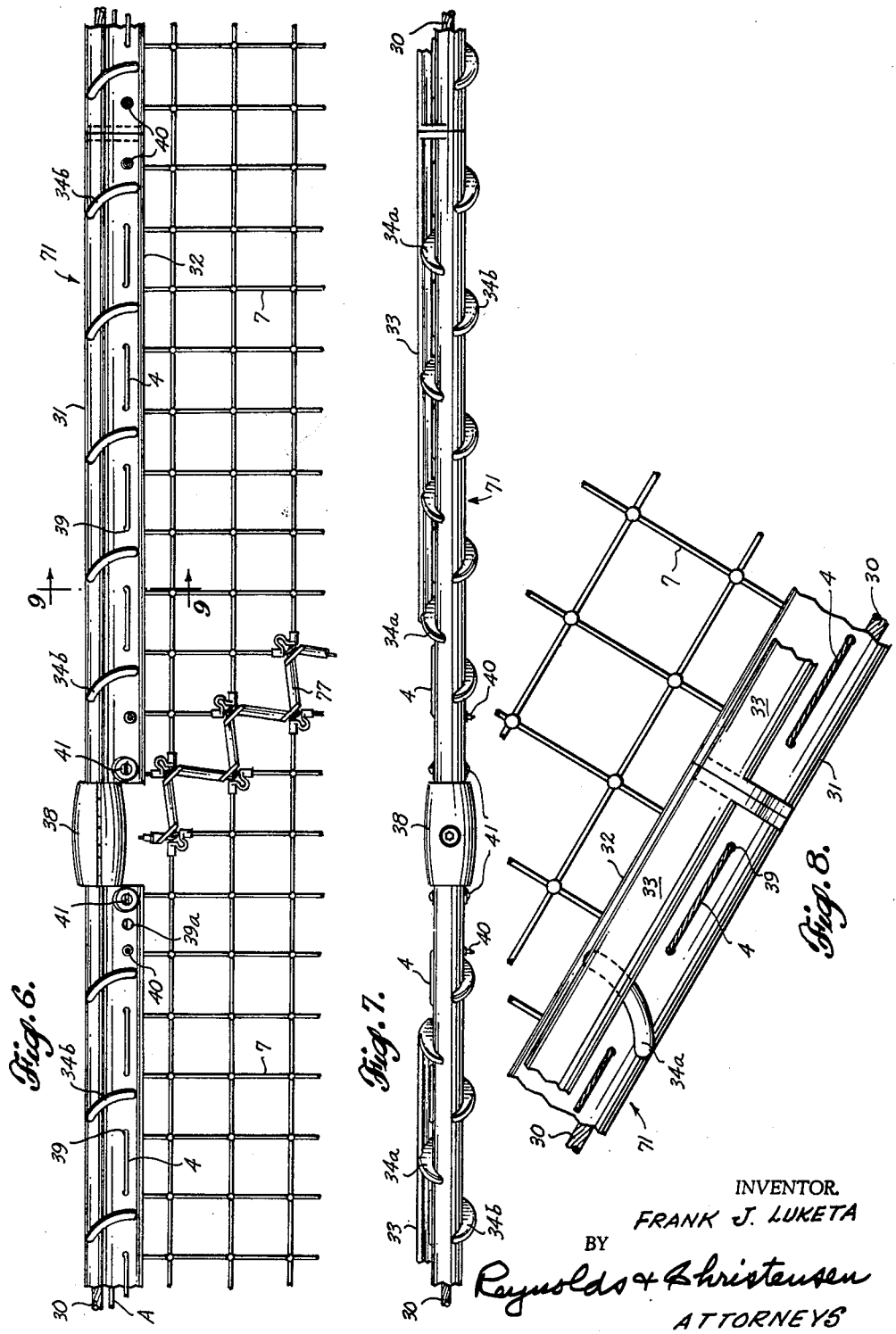

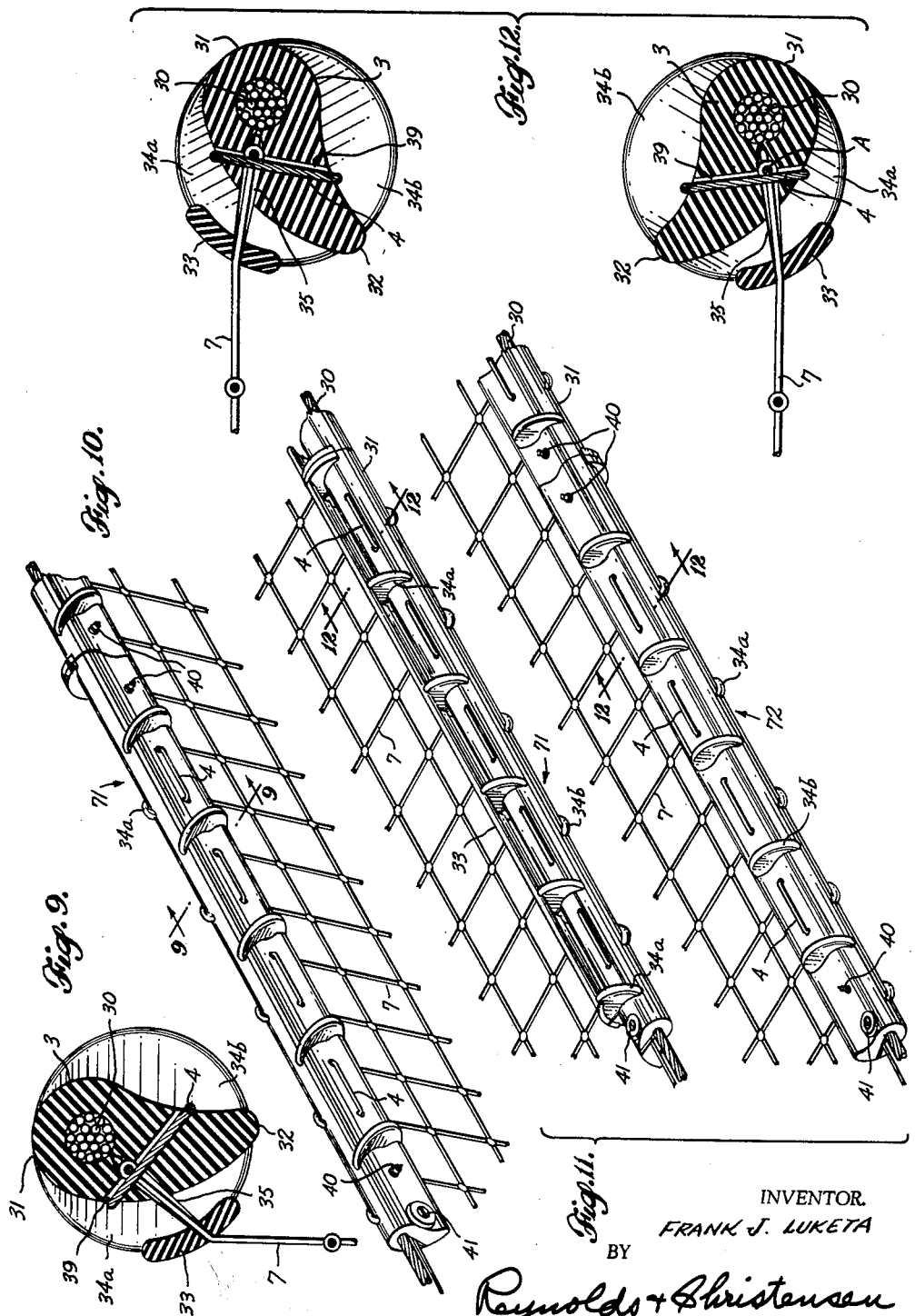

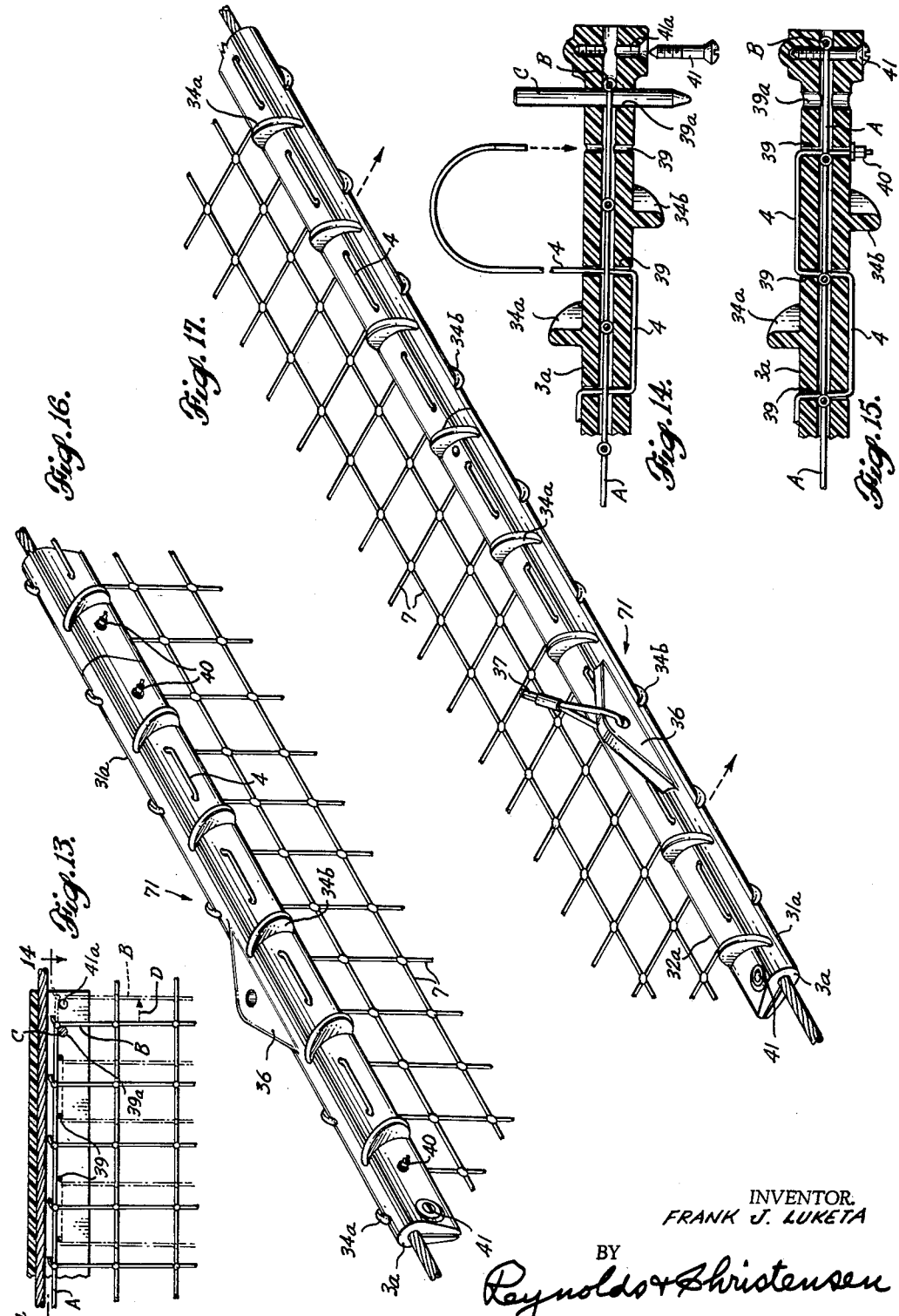

United States Patent Office 3,131,501
Patented May 5, 1964

3,131,501
LINES FOR TRAWL NETS
Frank J. Luketa, 5567 Greenwood Ave., Seattle, Wash.
Filed Apr. 9, 1962, Ser. No. 186,085
7 Claims. (Cl. 43—9)

In a companion application entitled Lines for Trawl Nets, Serial No. 186,087, filed April 9, 1962 there is described and claimed a line intended for use as a long curtain line for instance, which is formed with built-in means to do either or both of two things, namely, to buoy up (or to depress) the line, and to urge the line out of a catenary curve towards straightness. This is accomplished by encasing a steel cable core within a casing molded of rubber to define hydrofoil and/or water reaction surfaces. The netting of the curtain must be secured all along its edge to the line, or specifically to the casing, in a manner to avoid disturbance of the force-producing functions of such surfaces, yet strongly and accurately.

Another companion application entitled Lines for Trawl Nets, Serial No. 186,086, filed April 9, 1962, discloses and claims a hanging line assembly particularly suited for use with lines of the general character of Serial No. 186,087, and which have a point-cut netting panel edge which is hung from the line.

The present invention deals with the securement of such a line to a netting panel, to the ends indicated hereinabove, when the netting panel has a bar-cut edge, as it would normally in a mid-water trawl net curtain. Subject-matter common to Serial No. 186,086 and to this application will be claimed in Serial No. 186,086.

Additionally, it is an object to effect such securement easily and quickly, with the mesh squares distributed evenly along the line, and in a manner that will enable quick and easy release of the netting from the line when necessary.

Also, since it is desirable to make such lines in sections, capable of being joined end to end with like sections to constitute a line of required length, it is an object to use securing means between the line and the mesh panel that are best suited for use in the line sections of relatively short length, and suited for use according to a novel method hereinafter explained.

Further objects will appear hereinafter.

FIGURE 1 is an isometric view, partly broken away, of a mid-water trawl net, which is the type of net to which this invention is particularly applicable, but drawn to a scale too small to show details of the invention.

FIGURE 2 is a transverse section through the codend, at the line 2—2 of FIGURE 1, and FIGURE 3 is a similar section, illustrating the codend being hauled in over the stern of the trawler.

FIGURE 4 is an isometric view, to a larger scale, of a short length of an upper curtain line, showing the curtain and hanging line in their assembled position, and FIGURE 5 is a similar view, taken from the opposite side of the line, and partly broken away.

FIGURE 6 is an elevation of an upper curtain line and the curtain hanging limply therefrom, with the hanging line fully installed; FIGURE 7 is a plan view of the same; and FIGURE 8 is an enlarged elevational view from the side opposite the viewpoint of FIGURE 6.

FIGURE 9 is a sectional view at the line 9—9 of FIGURES 6 and 10.

FIGURE 10 is an isometric view, similar to FIGURE 6, and with the curtain hanging limply, showing the end of a curtain line section.

FIGURE 11 is an isometric view, similar to FIGURE 10, showing both the upper and lower curtain lines and the adjacent curtain meshes extending aft as a result of water reaction as the lines and the curtain are drawn through the water.

FIGURE 12 is a transverse section through the upper and lower curtain lines, at the section lines 12—12 of FIGURE 11.

FIGURE 13 is a sectional view of the curtain line, at the plane of the curtain mesh, showing in full lines the disposition of the meshes relative to the line during installation of the hanging line, and in dot-dash lines their relative disposition when fully installed.

FIGURES 14 and 15 are sectional views at the line 14—14 of FIGURE 13, FIGURE 14 illustrating the full-line disposition and FIGURE 15 the dot-dash line disposition.

FIGURE 16 is an isometric view of the curtain and its curtain line, the latter of a modified construction, and the curtain hanging limply, with the hanging line fully installed.

FIGURE 17 is a view similar to FIGURE 16, of the same curtain and curtain line, but both being now drawn forwardly through the water.

The midwater trawl net chosen to illustrate the application of this invention, shown best in FIGURE 1, includes a codend 9, closed by a purse line 90 at its after end and connected about its forward end to a rigid expander ring 91. A funnel 8 diverges forwardly from the expander ring to upper and lower bosoms 81, 82 respectively. Suspenders 1 which are part of the funnel, and to which they are joined at 83, are distributed at their after ends about the expander ring 91, and at their forward ends are concentrated at connectors 2 at the opposite sides, which are held against separation by a line 22. Sweep lines 50, buoyed up either by floats 54 at intervals or by other suitable means, drag the net forwardly by the connectors 2 and suspenders 1, being connected at their forward ends to doors 6, each towed by a towing warp 60, through a leg line 52 disconnectible at 51. Upper and lower curtain lines 71, 72, to which the corresponding edges of curtain 7 are secured, diverge forwardly from the opposite ends of the upper and lower bosoms 81, 82 respectively, and from the joints at 78 to the sides of the funnel, and are anchored to the doors 6 at 73, 74 through extensions or leg lines 75, 76, disconnectible at 77a and 77b. Slack lines 55 and 56, the latter connecting to the upper and lower curtain lines by a bridle 57, are in use only during hauling. For reasons not pertinent to this invention, the codend is constricted longitudinally at 9b, which divides it into two parallel compartments 9c and 9d and reduces its cross-sectional size from the full-round shown at 9a to a smaller size that more readily passes between upright guide posts 31c and over a roller 31b at the stern of the trawler, during hauling.

As has been explained in the companion Case Serial No. 186,087, referred to above, the curtain lines incorporate a stranded cable core 30 within a casing 3 of molded rubber or the like, slit at 35 to receive the edge bar A of the curtain, the mesh whereof is bar-cut. The slit 35 is formed not only in the casing proper, which has a fin-like element formed with water reaction surfaces of a cambered hydrofoil shape (except in the form of FIGURES 13 to 17) with a blunt nose 31 and thinner trailing edge 32, but also in spaced auxiliary hydrofoil surfaces 33, all of which hydrofoil surfaces afford lift to the line, or in the case of the lower curtain line 72 (FIGURE 11) may be arranged to depress the line. Water reaction surfaces 34a and 34b, arranged more or less helically, are provided for the purpose of straightening the line against a tendency to assume a catenary curve, as also explained in Serial No. 186,087. These surfaces 34a are also traversed by slits 35. The present invention is concerned with the hanging line 4 by which the edge bar A is engaged and the netting is suspended from the curtain line, and by which the slit 35 is held closed.

The casings 3 or 3a are apertured at intervals equal to the width of mesh squares of the curtain 7, or equal to whole multiples of that width (one, two, or more), the apertures 39 extending transversely to the slits 35, and being located slightly outwardly of the bottom of the slits.

At assembly of the curtain 7 with the curtain line 71 or 72, the edge bar A is entered fully within the slit 35, and a pin C (FIGURES 13 and 14) is passed through a hole 39a in the casing 3 or 3a, adjacent the end of a curtain section, in a manner to engage inside the terminal bar B of the curtain. When the curtain is pulled to draw terminal bar B against the pin C, as shown in full lines in FIGURE 13, all bars of the mesh transverse to edge bar A and parallel to terminal bar B are displaced lengthwise from the respective apertures 39. Now the hanging line 4 can be threaded back and forth through the apertures 39, as in FIGURE 14, without any possibility of interfering with the mesh bars, and with the assurance that the meshes will be properly spaced lengthwise. Finally, before removing the pin C and before threading home the retaining pin 41, the mesh is pulled in the sense indicated by arrow D in FIGURE 13, displacing all its meshes to the dot-dash line position of that figure. Now the terminal bar B is displaced beyond (to the right of) the location of retaining pin 41 and the hole 41a wherein it is received, and the pin 41 is inserted and threaded home. All intermediate transverse bars now contact the left-hand side of the hanging line 4, where the latter is threaded through the casings 3 or 3a, but the terminal bar B engages the right-hand side of pin 41. This locates each transverse bar accurately and immovably, and since the hanging line 4 has initially been passed inside the edge bar A, as has the screw 41 at the opposite end of the section, the hanging line accurately locates, and secures, the mesh 7 to the line 71 or 72. A terminal 40, swaged onto the end of the hanging line, secures the latter against unintended removal. Upon removing the terminal 40 (by simply cutting it off), the expendable hanging line is easily removed, and the mesh 7 can be disengaged from the line. The line 71 or 72 is preferably formed in separable sections, connected by couplers 38. The point-cut mesh of adjacent sections can be joined by connectors 77.

The form of casing for the lines 71, 72 which is shown in FIGURES 13, 16 and 17 differs from that of FIGURES 9 to 12 primarily in that the casing 3a is not oriented by the netting panel 7 into an attack angle to provide lift (or depression). Water reaction surfaces 34a and 34b develop catenary-correcting forces. Lift in this type of line is developed by floats (not shown) attached by lines 37 anchored to bosses 36 at intervals along the line 71 or 72. Such floats are afforded lifting or depressing forces, depending on whether the line is an upper or a lower curtain line.

I claim as my invention:

1. In combination with a curtain line or the like and a mesh curtain supported by an edge from said curtain line, the line being slit lengthwise and the edge bar of the curtain being received in said slit, and a hanging line threaded back and forth transversely of the slit and lengthwise of the line, and passing outwardly of the curtain's edge bar, to secure the curtain to the line.

2. In combination with a curtain line formed with a fin-like element extending lengthwise and having upper and lower water reaction surfaces, and slit lengthwise intermediate its water reaction surfaces, the edge bar of a mesh curtain being received in said slit, and a hanging line threaded back and forth through said fin-like element, transversely of the slit and lengthwise of the line, and passing outwardly of the curtain's edge bar, thereby to secure the curtain to the line.

3. The combination of claim 2, wherein the portions of the hanging line where they pass through the fin-like element are spaced substantially by the width of a whole multiple of the mesh squares of the curtain.

4. The combination of claim 2, wherein the fin-like element is formed with apertures transversely to the slit, and spaced longitudinally at intervals equal to the width of the curtain's mesh squares, the hanging line being threaded through said apertures and engaging the curtain's transverse bars all at the same side.

5. The combination of claim 4, and a terminal screw, spanning the slit at one end, and engaging the curtain's terminal bar at the side thereof opposite the side at which the other bars are engaged by the hanging line, said screw being spaced by the distance between the curtain's bars from the adjacent aperture for the hanging line.

6. In combination, in a trawl net, a mesh panel, a line for securement along a bar-cut edge of said panel, the line including a casing slit lengthwise, within which slit the edge bar of the panel is received, hanging line means threaded transversely of the line and the slit in its casing, outwardly of the edge bar, and at intervals lengthwise of the line corresponding to the width of the mesh squares, and engaging the transverse bars of the latter all along one side of such transverse bars, and means directed transversely of the slit and engaging at least one such transverse bar at the opposite side.

7. A method of installing a line having a casing formed with a longitudinally slit fin upon the bar-cut edge of a mesh panel, which comprises inserting such edge within the fin's slit, temporarily engaging a terminal transverse bar to locate it lengthwise within the slit, and pulling the edge to locate all the transverse bars at equal distances one from another in the slit, passing a hanging line means through the fin outwardly of the edge bar, and at intervals equal to the width of mesh squares, but intermediate the locations thereof, pulling the edge in the direction opposite the direction in which it was first pulled to engage one side of each transverse bar with a hanging line means, and to disengage the temporary retaining means, and passing a second retaining means through the fin in a position to engage the side of the terminal bar opposite to the side of other bars which are engaged by the hanging line.

References Cited in the file of this patent
UNITED STATES PATENTS

| 2,894,366 | Leckie | July 14, 1959 |

FOREIGN PATENTS

| 1,114,798 | France | Dec. 19, 1955 |
| 1,175,902 | France | Dec. 17, 1958 |
| 382,354 | Great Britain | Oct. 27, 1932 |